United States Patent Office 3,546,311
Patented Dec. 8, 1970

3,546,311
CONVERSION OF OLEFIN HYDROCARBONS
Louis F. Heckelsberg, Bartlesville, Okla., assignor to Phillips Petroleum Company, a corporation of Delaware
No Drawing. Filed Apr. 3, 1967, Ser. No. 627,618
Int. Cl. C07c 3/62
U.S. Cl. 260—683                                    7 Claims

ABSTRACT OF THE DISCLOSURE

Olefins are converted into other olefins having different numbers of carbon atoms by contact with a catalyst, active for disproportionating propylene into ethylene and butene, in the presence of a hydrocarbon derivative of phosphorous, arsenic, antimony or bismuth.

---

This invention relates to the conversion of olefin hydrocarbons according to the olefin reaction. In one aspect, this invention relates to a method for improving the effectiveness of the olefin reaction process for converting olfin hydrocarbons into other and different olefin hydrocarbons. In another aspect this invention relates to a method for increasing the effectiveness of an olefin reaction catalyst such as a catalyst effective for the disproportionation of propylene into ethylene and butenes.

The olefin reaction is defined as a process for the catalytic conversion over a catalyst of a feed comprising one or more ethylenically unsaturated compounds to produce a resulting product which contains at least ten percent by weight of product compounds, which product compounds can be visualized as resulting from at least one primary reaction, as defined below, or the combination of at least one primary reaction and at least one unsaturated bond isomerization reaction, and wherein the sum of the compounds contained in said resulting product consisting of hydrogen, saturated hydrocarbons, and compounds which can be visualized as formed by skeletal isomerization but which cannot be visualized as formed by one or more of the above-noted reactions, comprises less than twenty-five percent by weight of the total of said resulting product. Feed components and unsaturated bond isomers thereof are not included in the resulting product for the purpose of determining the above-noted percentages.

In the olefin reaction, as defined above, the primary reaction is a reaction which can be visualized as comprising the breaking of two existing unsaturated bonds between first and second carbon atoms and between third and fourth carbon atoms, respectively, and the formation of two new unsaturated bonds between said first and third and between said second and fourth carbon atoms. Said first and second carbon atoms and said third and fourth carbon atoms can be in the same or different molecules.

The olefin reaction according to this invention is illustrated by the following reactions:

(1) The disproportionation of an acyclic mono- or polyene having at least three carbon atoms into other acyclic mono- or polyenes of both higher and lower number of carbon atoms; for example, the disproportionation of propylene yields ethylene and butenes; the disproportionation of 1,5-hexadiene yields ethylene and 1,5,9-decatriene;

(2) The conversion of an acyclic mono- or polyene having three or more carbon atoms and a different acyclic mono- or polyene having three or more carbon atoms to produce different acyclic olefins; for example, the conversion of propylene and isobutylene yields ethylene and isopentene;

(3) The conversion of ethylene and an internal acrylic mono- or polyene having four or more carbon atoms to produce other olefins having a lower number of carbon atoms than that of the acyclic mono- or polyenes; for example, the conversion of ethylene and 4-methylpentene-2 yields 3-methylbutene-1 and propylene;

(4) The conversion of ethylene or an acyclic mono- or polyene having three or more carbon atoms and a cyclic mono- or cyclic polyene to produce an acyclic polyene having a higher number of carbon atoms than that of any of the starting materials; for example, the conversion of cyclohexene and 2-butene yields 2,8-decadiene; the conversion of 1,5-cyclooctadiene and ethylene yields 1,5,9-decatriene;

(5) The conversion of one or more cyclic mono- or cyclic polyenes to produce a cyclic polyene having a higher number of carbon atoms than any of the starting materials; for example, the conversion of cyclopentene yields 1,6-cyclodecadiene;

(6) The conversion of an acyclic polyene having at least seven carbon atoms and having at least five carbon atoms between any two double bonds to produce acyclic and cyclic mono- and polyenes having a lower number of carbon atoms than that of the feed; for example, the conversion of 1,7-octadiene yields cyclohexene and ethylene; or (7) The conversion of one or more acyclic polyenes having at least three carbon atoms between any two double bonds to produce acyclic and cyclic mono- and polyenes generally having both a higher and lower number of carbon atoms than that of the feed material; for example, the conversion of 1,4-pentadiene yields 1,4-cyclohexadiene and ethylene.

In catalytic conversions, such as the olefin reaction wherein olefins are converted into other olefins, the purity of the feed is an important factor. In some catalytic reactions, a catalyst is rendered more effective by treatment prior to use with a selected material which has a benficial effect upon the catalyst. In still other chemical reactions, an adjuvant is often admixed with the feed to the process to render the catalyst more effective in the reaction.

I have found that the olefin reaction is improved by the addition to the feed olefin, a small amount of a hydrocarbon compound of a Group V–A [1] element having an atomic number of at least 15, such as, for example, the hydrocarbon derivative of phosphorus, arsenic, antimony or bismuth. The hydrocarbon derivative of the Group V–A elements which are applicable for use in this invention are those corresponding to the formula:

wherein: M is phosphorus, arsenic, antimony, or bismuth and $R_1$, $R_2$ and $R_3$ are alkyl, cycloalkyl, aryl, alkaryl, or aralkyl radicals having up to about 15 carbon atoms each. The $R_1$, $R_2$ and $R_3$ can be the same or different radicals.

Some examples of the V–A compounds which can be used include tributylphosphine, triphenylphosphine, tricyclopentylphosphine, trimethylphosphine, methylethylbutylphosphine, dixylylphenylphosphine, tritolylphosphine, tri(2,6 - di - n - butyl - 4 - methylphenyl)phosphine, tri-n-dodecylphosphine, and the like, and mixtures thereof. The corresponding arsines, stibines, and bismuthines, for example, tributylarsine, tributylstibine and tributylbismuthine, can be used but the phosphines are presently preferred.

The hydrocarbon derivative of the Group V–A element is added to the olefin feedstream in amounts which are ---
[1] Handbook of Chemistry and Physics, Chemical Rubber Company, 45th ed. (1964).

effective to obtain optimum conversion of the olefin feed into the desired olefins. Optimum amounts for a specific feed can be readily determined by routine experimentation. Ordinarily, the phosphine is added in amounts ranging from about 100 parts by weight per million to about 1 percent by weight based on the olefin-containing feedstream.

The hydrocarbon derivative, for example, the hydrocarbon phosphine, can be blended into the olefin feed in any conventional manner. It can simply be dissolved in liquid olefin feed or vaporized and blended with gaseous olefin feedstreams. The material can be added continuously or intermittently. For example, one using fixed bed operation, the phosphine can be introduced into the feedstream after the conversion has fallen below a predetermined level. In addition to its ability to improve the conversion rate of the olefin reaction, the addition of the hydrocarbon phosphine has also been found to reduce the isomerization tendencies of some olefin reaction catalysts such as the silica-supported tungsten oxide catalyst.

Other than the introduction of the hydrocarbon phosphine to the olefin feed, the olefin reaction process is carried out according to conventional techniques using known conditions of operation and known olefin reaction catalysts.

The catalysts which are useful for the present invention are those which have activity for the disproportionation of propylene into ethylene and butenes. Some examples of such catalysts are (1) Silica or thoria promoted by an oxide or compound convertible to an oxide by calcination or sulfide of tungsten or molybdenum or by an oxide or compound convertible to an oxide by calcination of rhenium or tellurium;

(2) Alumina promoted with an oxide or compound convertible to an oxide by calcination of molybdenum, tungsten, or rhenium; a sulfide of tungsten or molybdenum; or an alkali metal salt, ammonium salt, alkaline earth metal salt, or bismuth salt of phosphomolybdic acid;

(3) One or more of the group aluminum phosphate, zirconium phosphate, calcium phosphate, magnesium phosphate, or titanium phosphate promoted by one or more of a sulfide of molybdenum or tungsten, or an oxide or compound convertible to an oxide by calcination of molybdenum, tungsten or rhenium or magnesium tungstate or beryllium phosphotungstate; and (4) Silica, alumina, aluminum phosphate, zirconium phosphate, calcium phosphate, magnesium phosphate, or titanium phosphate promoted by a hexacarbonyl of molybdenum or tungsten.

The catalysts of (1) can be prepared and activated by conventional techniques such as by combining a catalyst grade silica with suitable tungsten, molybdenum, rhenium or tellurium compounds by a conventional method such as, for example, impregnation, dry mixing, or coprecipitation. Suitable tungsten and molybdenum compounds include oxide and molybdenum oxide and compounds convertible to these oxides. The supported oxides are activated by calcining in air and the supported sulfides are activated by heating in an inert atmosphere.

The catalysts of (2) can be prepared and activated by conventional techniques such as by combining catalyst grade alumina with an oxide or a compound convertible to an oxide by calcination of molybdenum, tungsten or rhenium and calcining the resulting mixture after removal of any solvent used in the impregnation. The sulfides of tungsten or molybdenum or the salts of phosphomolybdic acid can be utilized to impregnate a catalyst grade alumina by solution in a proper solvent after which the solvent is evaporated and the resulting mixture dried to prepare the catalyst.

The catalyst compositions of (3) can be prepared and activated by conventional techniques. For example, molybdenum oxide can be coprecipitated with aluminum phosphate followed by calcination in air to produce an activated catalyst. Alternatively, the support material can be impregnated with a compound of the promoter convertible to the oxide, such as ammonium tungstate, followed by calcination in air. In the preparation of a sulfide-containing catalyst, a sulfide of the promoter can be ball-milled with a support, such as zirconium phosphate, followed by heating in an inert atmosphere such as nitrogen. Magnesium tungstate and beryllium phosphotungstate can be dry mixed with titanium phosphate, for example, and activated by calcination in the air at elevated temperatures.

The catalyst compositions of (4) can be prepared and activated by impregnating a previously calcined support material such as calcium phosphate with a solution of the hexacarbonyl of the promoter in an organic solvent such as benzene, followed by drying in a vacuum or in an inert atmosphere at about 50 to 700° F.

The catalytic agent is considered to be the reaction product resulting from the admixture of the support material and the promoter material which is subjected to activation treatment.

The operating temperature for the process of this invention when using catalysts of (1) is in the range of about 400 to 1100° F. The process of this invention when using the catalysts of (2) will be operated at a temperature in the range of about 150 to 500° F. The process using the catalysts of (3) will be carried out at a temperature of about 600 to 1200° F. The process using the catalysts of (4) will be carried out at a temperature of about 0 to 600° F. In the process of the invention, pressures are not important but will be in the range of about 0 to 2,000 p.s.i.g.

Other catalysts include those disclosed in Ser. No. 412,343, filed Nov. 19, 1964, now Pat. No. 3,395,196; Ser. No. 517,918, filed Jan. 3, 1966, now Pat. No. 3,442,969; Ser. No. 517,905, filed Jan. 3, 1966, now Pat. No. 3,444,262; Ser. No. 421,692, filed Dec. 28, 1964, now Pat. No. 3,418,390; Ser. No. 529,230, filed Feb. 23, 1966, now abandoned; Ser. No. 516,673, filed Dec. 27, 1965; and U.S. Pat. No. 3,261,879, issued July 19, 1966.

With a fixed bed reactor and continuous operation, weight hourly space velocities in the range of 0.5 to 1,000 parts by weight of hydrocarbon feed per part by weight of catalyst per hour are suitable with excellent results having been obtained in the range of 1 to 200. The space rates of the examples are within the above range.

Olefins applicable for use in the process of the invention are acyclic mono- and polyenes having at least 3 carbon atoms per molecule and cycloalkyl and aryl derivatives thereof; cyclic mono- and polyenes having at least 4 carbon atoms per molecule and alkyl and aryl derivatives thereof; mixtures of the above olefins; and mixtures of ethylene and the above olefins. Many useful reactions are accomplished with such acyclic olefins having 3 to 30 carbon atoms per molecule and with such cyclic olefins having 4 to 30 carbon atoms per molecule.

Some specific examples of acyclic olefins suitable for reactions of this invention include propylene, 1-butene, isobutene, 2-butene, 1,3-butadiene, 1-pentene, 2-pentene, isoprene, 1-hexene, 1,4-hexadiene, 2-heptene, 1-octene, 2,5-octadiene, 2,4,6-octatriene, 2-nonene, 1-dodecene, 2-tetradecene, 1-hexadecene, 5,6-dimethyl-2,4-octadiene, 1-methyl-1-butene, 2-methyl-2-butene, 1,3-dodecadiene, 1,3,6-dodecatriene, 3-methyl-1-butene, 1-phenylbutene-2, 7,7-diethyl-1,3,5-decatriene, 1,3,5,7,9-octadecapentaene, 1,3-eicosadiene, 4-octene, allylbenzene, 3-eicosene and 3-heptene, and the like, and mixtures thereof.

Some specific examples of cyclic olefins suitable for the reactions of this invention are cyclebutene, cyclopentene, cyclohexene, 3-methylcyclopentene, 4-ethylcyclohexene, cyclooctene, 5-n-propylcyclooctene, cyclodecene, cyclododecene, 3,3,5,5-tetramethylcyclononene, 3,4,5,6,7-pentaethylcyclodecene, 1,5-cyclooctadiene, 1,5,9-cyclodecatriene, 1,4,7,10-cyclododecatetraene, 2-methyl-6-ethylcyclooctadiene-1,4, 4-benzylcyclohexene, and the like, and mixtures thereof.

The following specific embodiments of the invention will be helpful in attaining an understanding of the invention. These, however, should be considered exemplary and not as unduly limiting the invention.

EXAMPLES

A cylinder of technical grade 2-pentene was blended with tributylphosphine to make a 1 weight percent solution of that material. This treated olefin feed was converted in a fixed bed operation over a silica-tungsten oxide catalyst which contained about 8 weight percent tungsten oxide. The pentene-2 was passed through the catalytic bed at a space rate of about 10 grams of feed per gram of catalyst per hour, at a temperature of 800° F., and at a pressure of 10 p.s.i.g.

The effluent from the reactor was sampled, analyzed, and the results are shown in the table below:

TABLE I

| Time on stream | ½ hr. | 1½ hr. |
|---|---|---|
| Product, wt. percent: | | |
| Propylene | 0.1 | 0.1 |
| 1-butene | 0.3 | 0.2 |
| t-2-butene | 8.4 | 8.1 |
| c-2-butene | 5.5 | 5.3 |
| Pentenes | 65.0 | 66.8 |
| Hexenes | 20.7 | 19.5 |
| Conversion, percent | 35 | 33 |

For purposes of comparison, another cylinder containing the same technical grade pentene-2 but without the addition of a hydrocarbon phosphine was used to provide the feedstream in the same apparatus, using the same catalyst and under the same conditions. The effluent analysis was as follows:

TABLE II

| Time on stream | ½ hr. | 1½ hr. * | 2½ hr. | 3½ hr. |
|---|---|---|---|---|
| Product, wt. percent: | | | | |
| Propylene | t | | t | t |
| 1-butene | 0.1 | | 0.1 | 0.1 |
| t-2-butene | 0.6 | 0.3 | 4.9 | 5.7 |
| c-2-butene | 0.4 | 0.2 | 30.3 | 3.8 |
| Pentenes | 98.0 | 99 | 80.2 | 77.5 |
| Hexenes | 0.9 | ? | 11.5 | 12.9 |
| Conversion | 2 | 1 | 20 | 23 |

* After the 1½ hr. sampling, tributylphosphine was added to the feed cylinder in an amount of about 1 wt. percent based on the feed.

The above date show that, without the phosphine treatment, the pentene-2 feed undergoes very little conversion. When tributylphosphine was added to this fed cylinder after 1½ hrs. of operation, the catalytic reaction was recovered and the pentene-2 was converted at a substantially high rate. Tributylarsine, tributylstibine and tributylbismuthine affect the conversion of the pentene-2 similarly.

That which is claimed is:

1. In the process of converting an olefin in the olefin reaction wherein at least one olefin is contacted with a catalyst active for disproportionating propylene into ethylene and butene, under conditions, including conditions of temperature, pressure and contact time, suitable for obtaining with the selected catalyst, a product of the olefin reaction which, as defined herein, can be visualized as comprising the reaction between two first pairs of carbon atoms, the two carbon atoms of each first pair being connected by an olefinic double bond, to form two new pairs from the carbon atoms of said first pairs, the two carbon atoms of each of said new pairs being connected by an olefinic double bond, the improvement comprising adding to said olefin, prior to contact with said catalyst, a compound having the formula:

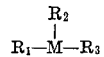

wherein M is phosphorous, arsenic, antimony or bismuth and $R_1$, $R_2$ and $R_3$ are alkyl, cycloalkyl, aryl, alkaryl, or aralkyl radicals, each having up to about 15 carbon atoms; and wherein $R_1$, $R_2$ and $R_3$ can be the same or different; and feeding the resulting mixture to said catalyst.

2. The process of claim 1 wherein the olefin is 2-pentene and the olefin reaction is disproportionation.

3. The process of claim 2 wherein the compound is tributylphosphine.

4. The process of claim 1 wherein the olefin is 2-pentene; the olefin reaction is disproportionation; the temperature is in the range of about 150 to 1200° F.; the pressure is in the range of 0 to about 1500 p.s.i.g.; the contact time is in the range of about 0.1 second to 10 hours; the Group V-A compound is tributylphosphine; and the catalyst is silica, alumina, thoria or a phosphate of aluminum, zirconium, titanium, or calcium promoted by a sulfide or hexacarbonyl of molybdenum or tungsten, or an oxide of molybdenum, tungsten, tellurium or rhenium or magnesium tungstate or beryllium phosphotungstate.

5. The process of claim 1 wherein said olefin is selected from the group consisting of an acrylic mono- and polyene having 3 to 30 carbon atoms per molecule, cyclic mono- and polyenes having at least 4 carbon atoms per molecule, mixtures of the above olefins and mixtures of ethylene and the above olefins.

6. The process of claim 1 wherein said olefin is an acrylic monoene.

7. The process of claim 6 wherein the catalyst is silica, alumina, thoria or a phosphate of aluminum, zirconium, titanium, or calcium promoted by a sulfide or hexacarbonyl of molybdenum or tungsten, or an oxide of molybdenum, tungsten, tellurium or rhenium, or magnesium tungstate or beryllium phosphotungstate and the temperature is in the range of about 150 to 1200° F.

References Cited

UNITED STATES PATENTS

| 2,314,466 | 3/1943 | Thwaites | 260—666.5 |
| 2,833,741 | 5/1958 | Lal | 260—666.5 |
| 3,261,879 | 7/1966 | Banks | 260—683 |
| 3,363,014 | 1/1968 | Kittleman et al. | 260—683.2 |
| 3,418,390 | 12/1968 | Heckelsberg | 260—683 |

DELBERT E. GANTZ, Primary Examiner

C. E. SPRESSER, JR., Assistant Examiner

U.S. Cl. X.R.

260—666, 668, 677, 680; 252—426, 427

UNITED STATES PATENT OFFICE

CERTIFICATE OF CORRECTION

Patent No. 3,546,311                                        Dated: December 8, 1970

Louis F. Heckelsberg

It is certified that error appears in the above-identified patent and that sa: Letters Patent are hereby corrected as shown below:

Column 6, line 33, delete "acrylic" and insert --- acyclic ---; Column 6, lin delete "acrylic" and insert --- acyclic ---.

Signed and sealed this 23rd day of March 1971.

(SEAL)
Attest:

EDWARD M. FLETCHER, JR.                        WILLIAM E. SCHUYLER, JR.
Attesting Officer                                  Commissioner of Patents